US012793670B2

(12) United States Patent
Kim et al.

(10) Patent No.: US 12,793,670 B2
(45) **Date of Patent: *Nov. 10, 2026**

(54) GAMMA VOLTAGE CONTROL CIRCUIT, DISPLAY APPARATUS INCLUDING THE SAME AND ELECTRONIC APPARATUS INCLUDING THE SAME

(71) Applicant: Samsung Display Co., Ltd., Yongin-Si (KR)

(72) Inventors: Hyunchang Kim, Yongin-si (KR); Se-Byung Chae, Yongin-si (KR); Subin Kim, Yongin-si (KR); Sangmin Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/350,076

(22) Filed: Oct. 6, 2025

(65) Prior Publication Data

US 2026/0031060 A1 Jan. 29, 2026

Related U.S. Application Data

(63) Continuation of application No. 18/369,210, filed on Sep. 18, 2023, now Pat. No. 12,451,097.

(30) Foreign Application Priority Data

Dec. 13, 2022 (KR) ........................ 10-2022-0174177

(51) Int. Cl.
*G09G 3/36* (2006.01)
*G09G 3/32* (2016.01)
(Continued)

(52) U.S. Cl.
CPC ............ *G09G 3/3696* (2013.01); *G09G 3/32* (2013.01); *G09G 3/3258* (2013.01);
(Continued)

(58) Field of Classification Search
CPC ..... G09G 2310/0291; G09G 2310/027; G09G 2310/0259; G09G 2310/06;
(Continued)

(56) References Cited

U.S. PATENT DOCUMENTS 9,460,681 B2 10/2016 Hwang et al.
9,530,357 B2 12/2016 Kim et al.
(Continued)

FOREIGN PATENT DOCUMENTS

KR 10-1990975 B1 6/2019
KR 10-2144060 B1 8/2020
(Continued)

*Primary Examiner* — Dong Hui Liang
(74) *Attorney, Agent, or Firm* — Innovation Counsel LLP

(57) ABSTRACT

A gamma voltage control circuit includes a first amplifier and a second amplifier. The first amplifier is configured to generate a first primitive reference voltage based on a panel power voltage applied to a display panel. The second amplifier is configured to generate a first reference voltage based on the first primitive reference voltage, the panel power voltage and an internal power voltage.

19 Claims, 11 Drawing Sheets

(51) Int. Cl.
*G09G 3/3258* (2016.01)
*G09G 3/3291* (2016.01)

(52) U.S. Cl.
CPC ......... *G09G 3/3291* (2013.01); *G09G 3/3688* (2013.01); *G09G 2310/027* (2013.01); *G09G 2310/0291* (2013.01); *G09G 2320/0276* (2013.01)

(58) Field of Classification Search
CPC ..... G09G 2310/0289; G09G 2330/021; G09G 2330/028; G09G 2330/08; G09G 2330/12; G09G 3/3696; G09G 3/3688; G09G 3/3648; G09G 3/20; G09G 3/32; G09G 3/2014; G09G 3/066; G09G 3/2011; G09G 3/3614; G09G 3/3233; G09G 3/2018; G09G 3/3655; G09G 3/3291; G09G 3/3685; G09G 2300/0426; G09G 2300/0819; G09G 2300/0439; G09G 2320/0233; G09G 2320/0276; G09G 2320/0673; G09G 2320/0209; G09G 2320/064; G09G 2320/0223
See application file for complete search history.

(56) References Cited

U.S. PATENT DOCUMENTS

| | | | | |
|---|---|---|---|---|
| 11,462,146 | B2 | 10/2022 | Chae et al. | |
| 2008/0291190 | A1* | 11/2008 | Kim | G09G 3/3648 345/211 |
| 2015/0364093 | A1* | 12/2015 | Kim | G09G 3/3291 345/212 |
| 2016/0307536 | A1* | 10/2016 | Okabe | G09G 3/3696 |
| 2017/0097649 | A1* | 4/2017 | Lee | G05F 1/575 |

FOREIGN PATENT DOCUMENTS

| | | | |
|---|---|---|---|
| KR | 10-2020-0108226 | A | 9/2020 |
| KR | 10-2022-0100778 | A | 7/2022 |

* cited by examiner

GAMMA VOLTAGE CONTROL CIRCUIT, DISPLAY APPARATUS INCLUDING THE SAME AND ELECTRONIC APPARATUS INCLUDING THE SAME

PRIORITY STATEMENT

This application is a continuation of U.S. patent application Ser. No. 18/369,210 filed on Sep. 18, 2023, now U.S. Pat. No. 12,451,097, which claims priority under 35 U.S.C. § 119 to Korean Patent Application No. 10-2022-0174177, filed on Dec. 13, 2022 in the Korean Intellectual Property Office KIPO, the contents of which are incorporated herein by reference in their entireties.

BACKGROUND

1. Field

The present inventive concept relates to a gamma voltage control circuit, a display apparatus including the gamma voltage control circuit and an electronic apparatus including the gamma voltage control circuit.

2. Description of the Related Art

Generally, a display apparatus includes a display panel and a display panel driver. The display panel displays an image based on an input image and includes a plurality of gate lines, a plurality of data lines and a plurality of pixels.

The display panel driver includes a gate driver and a data driver. The gate driver outputs gate signals to the gate lines. The data driver outputs data voltages to the data lines. The display panel driver may further include a gamma reference voltage generator applying a gamma reference voltage to the data driver and a gamma voltage control circuit applying a first reference voltage and a second reference voltage for generating the gamma reference voltage to the gamma reference voltage generator.

When noise occurs in a panel power voltage applied to the display panel, undesired luminance may be displayed on the display panel due to a difference between the first and second reference voltages, and the panel power voltage.

Particularly, the noise of the panel power voltage is increasing recently due to a high resolution, a high luminance, a high frame rate, and a material change, and a sensitivity of the display panel to the noise is deteriorating.

SUMMARY

Embodiments of the present inventive concept may provide a gamma voltage control circuit in which a change of a panel power voltage applied to a display panel is quickly reflected in a first reference voltage and a second reference voltage applied to a gamma reference voltage generator to enhance a display quality.

Embodiments of the present inventive concept may provide a display apparatus including the gamma voltage control circuit.

Embodiments of the present inventive concept may provide an electronic apparatus including the gamma voltage control circuit.

In an embodiment of a gamma voltage control circuit according to the present inventive concept, the gamma voltage control circuit includes a first amplifier and a second amplifier. The first amplifier is configured to generate a first primitive reference voltage based on a panel power voltage applied to a display panel. The second amplifier is configured to generate a first reference voltage based on the first primitive reference voltage, the panel power voltage and an internal power voltage.

In an embodiment, the gamma voltage control circuit may further include a resistor string including a first end configured to receive the panel power voltage and a first decoder connected to the resistor string and the first amplifier.

In an embodiment, the first amplifier may be a first low dropout regulator.

In an embodiment, the first amplifier may include a non-inverting input terminal connected to the first decoder, an inverting input terminal connected to a first node, an output terminal configured to output the first primitive reference voltage, a first resistor connected between the output terminal and the first node and a second resistor connected between the first node and a ground.

In an embodiment, the second amplifier may be a first differential amplifier.

In an embodiment, the first amplifier may include a non-inverting input terminal configured to receive the first primitive reference voltage and the panel power voltage, an inverting input terminal configured to receive the internal power voltage and an output terminal configured to output the first reference voltage.

In an embodiment, the gamma voltage control circuit may further include a third resistor including a first end portion connected to an output terminal of the first amplifier and a second end portion connected to the non-inverting input terminal of the second amplifier, a fourth resistor including a first end portion configured to receive the panel power voltage and a second end portion connected to the non-inverting input terminal of the second amplifier, a fifth resistor including a first end portion configured to receive the internal power voltage and a second end portion connected to the inverting input terminal of the second amplifier and a sixth resistor including a first end portion connected to the inverting input terminal of the second amplifier and a second end portion connected to the output terminal of the second amplifier.

In an embodiment, when the first reference voltage is VAREG, the first primitive reference voltage is VREG, the panel power voltage is VELVDD and the internal power voltage is VNELVDD, VAREG=VREG+VELVDD−VNELVDD may be satisfied.

In an embodiment, the gamma voltage control circuit may further include a third amplifier configured to generate a second primitive reference voltage based on the panel power voltage and a fourth amplifier configured to generate a second reference voltage based on the second primitive reference voltage, the panel power voltage and the internal power voltage.

In an embodiment, the gamma voltage control circuit may further include a second decoder connected between the resistor string and the third amplifier.

In an embodiment, the third amplifier may be a second low dropout regulator.

In an embodiment, the third amplifier may include a non-inverting input terminal connected to the second decoder, an inverting input terminal connected to a second node, an output terminal configured to output the second primitive reference voltage, a seventh resistor connected between the output terminal and the second node and an eighth resistor connected between the second node and a ground.

In an embodiment, the fourth amplifier may be a second differential amplifier.

In an embodiment, the fourth amplifier may include a non-inverting input terminal configured to receive the second primitive reference voltage and the panel power voltage, an inverting input terminal configured to receive the internal power voltage and an output terminal configured to output the second reference voltage.

In an embodiment, the gamma voltage control circuit may further include a fifth amplifier configured to generate the internal power voltage based on the panel power voltage.

In an embodiment, the gamma voltage control circuit may further include a third decoder connected between the resistor string and the fifth amplifier.

In an embodiment of a gamma voltage control circuit according to the present inventive concept, the gamma voltage control circuit includes a first amplifier, a second amplifier and a third amplifier. The first amplifier is configured to generate an internal power voltage based on a panel power voltage applied to a display panel. The second amplifier is configured to generate a first reference voltage based on a first primitive reference voltage, the panel power voltage and the internal power voltage. The third amplifier is configured to generate a second reference voltage based on a second primitive reference voltage, the panel power voltage and the internal power voltage.

In an embodiment, the gamma voltage control circuit may further include a resistor string including a first end configured to receive the panel power voltage and a second end configured to receive an internal reference voltage and a decoder connected between the resistor string and the first amplifier.

In an embodiment, the first amplifier may include a non-inverting input terminal configured to receive a bias voltage, an inverting input terminal connected to a third node, an output terminal configured to output the internal power voltage, a first resistor connected between the decoder and the third node and a second resistor connected between the inverting input terminal and the output terminal.

In an embodiment, the second amplifier may include a non-inverting input terminal configured to receive the first primitive reference voltage and the panel power voltage, an inverting input terminal configured to receive the internal power voltage and an output terminal configured to output the first reference voltage.

In an embodiment, the third amplifier may include a non-inverting input terminal configured to receive the second primitive reference voltage and the panel power voltage, an inverting input terminal configured to receive the internal power voltage and an output terminal configured to output the second reference voltage.

In an embodiment of a display apparatus according to the present inventive concept, the display apparatus includes a display panel, a power voltage generator, a gate driver, a data driver, a gamma reference voltage generator and a gamma voltage control circuit. The power voltage generator is configured to output a panel power voltage to the display panel. The gate driver is configured to output a gate signal to the display panel. The data driver is configured to output a data voltage to the display panel. The gamma reference voltage generator is configured to output a gamma reference voltage to the data driver. The gamma voltage control circuit is configured to output a first reference voltage and a second reference voltage to the gamma reference voltage generator. The gamma voltage control circuit includes a first amplifier configured to generate a first primitive reference voltage based on a panel power voltage and a second amplifier configured to generate a first reference voltage based on the first primitive reference voltage, the panel power voltage and an internal power voltage.

In an embodiment, the gamma voltage control circuit may further include a third amplifier configured to generate a second primitive reference voltage based on the panel power voltage and a fourth amplifier configured to generate a second reference voltage based on the second primitive reference voltage, the panel power voltage and the internal power voltage.

In an embodiment, the data driver and the gamma reference voltage generator may be integrally formed.

In an embodiment of an electronic apparatus according to the present inventive concept, the electronic apparatus includes a display panel, a power voltage generator, a gate driver, a data driver, a gamma reference voltage generator, a gamma voltage control circuit, a driving controller and a processor. The power voltage generator is configured to output a panel power voltage to the display panel. The gate driver is configured to output a gate signal to the display panel. The data driver is configured to output a data voltage to the display panel. The gamma reference voltage generator is configured to output a gamma reference voltage to the data driver. The gamma voltage control circuit is configured to output a first reference voltage and a second reference voltage to the gamma reference voltage generator. The driving controller is configured to control the gate driver and the data driver. The processor is configured to output input image data and an input control signal to the driving controller. The gamma voltage control circuit includes a first amplifier configured to generate a first primitive reference voltage based on a panel power voltage and a second amplifier configured to generate a first reference voltage based on the first primitive reference voltage, the panel power voltage and an internal power voltage.

According to the gamma voltage control circuit, the display apparatus including the gamma voltage control circuit and the electronic apparatus including the gamma voltage control circuit, the gamma voltage control circuit may generate the first primitive reference voltage based on the panel power voltage applied to the display panel and may generate the first reference voltage based on the first primitive reference voltage so that the change of the panel power voltage may be quickly reflected in the first reference voltage.

In addition, the gamma voltage control circuit may generate the second primitive reference voltage based on the panel power voltage applied to the display panel and may generate the second reference voltage based on the second primitive reference voltage so that the change of the panel power voltage may be quickly reflected in the second reference voltage.

Alternatively, the gamma voltage control circuit may generate the internal power voltage based on the panel power voltage applied to the display panel and may generate the first reference voltage and the second reference voltage based on the internal power voltage so that the change of the panel power voltage may be quickly reflected in the first reference voltage and the second reference voltage.

Thus, when the noise occurs in the panel power voltage, the first and second reference voltages may quickly follow the panel power voltage so that undesired luminance may be prevented from being displayed on the display panel due to a difference between the first and second reference voltages, and the panel power voltage. Thus, the display quality of the display panel may be enhanced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
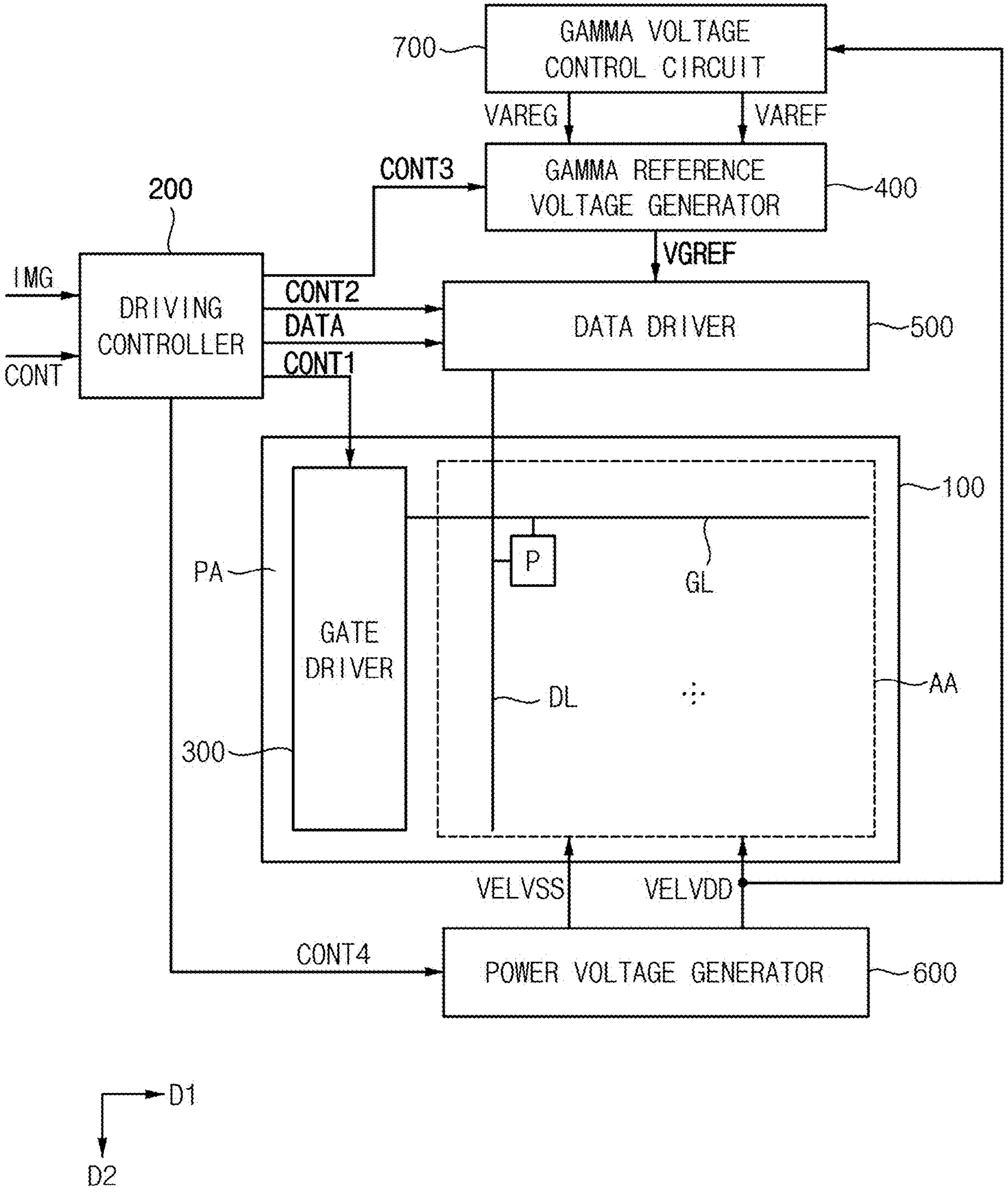
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500.

The display panel driver may further include a power voltage generator 600. The power voltage generator 600 may generate a panel power voltage VELVDD and a low panel power voltage VELVSS which are applied to the display panel 100. The display panel driver may further include a gamma voltage control circuit 700. The gamma voltage control circuit 700 may output a first reference voltage VAREG and a second reference voltage VAREF to the gamma reference voltage generator 400.

The power voltage generator 600 may apply the panel power voltage VELVDD and the low panel power voltage VELVSS to the display panel 100. In addition, the power voltage generator 600 may output the panel power voltage VELVDD to the gamma voltage control circuit 700.

For example, the driving controller 200 and the data driver 500 may be integrally formed. For example, the driving controller 200, the gamma reference voltage generator 400 and the data driver 500 may be integrally formed. For example, the driving controller 200, the gamma reference voltage generator 400, the data driver 500 and the gamma voltage control circuit 700 may be integrally formed. A driving module including at least the driving controller 200 and the data driver 500 which are integrally formed may be called to a timing controller embedded data driver (TED).

The display panel 100 has a display region AA on which an image is displayed and a peripheral region PA adjacent to the display region AA.

The display panel 100 includes a plurality of gate lines GL, a plurality of data lines DL and a plurality of pixels P connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus (e.g. a processor). The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a gate control signal CONT1, a data control signal CONT2, a gamma control signal CONT3, a power control signal CONT4 and a data signal DATA based on the input image data IMG and the input control signal CONT.

The driving controller 200 generates the gate control signal CONT1 for controlling an operation of the gate driver 300 based on the input control signal CONT, and outputs the gate control signal CONT1 to the gate driver 300. The gate control signal CONT1 may further include a vertical start signal and a gate clock signal.

The driving controller 200 generates the data control signal CONT2 for controlling an operation of the data driver 500 based on the input control signal CONT, and outputs the data control signal CONT2 to the data driver 500. The data control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the gamma control signal CONT3 for controlling an operation of the gamma reference voltage generator 400 based on the input control signal CONT, and outputs the gamma control signal CONT3 to the gamma reference voltage generator 400.

The gate driver 300 generates gate signals driving the gate lines GL in response to the gate control signal CONT1 received from the driving controller 200. The gate driver 300 outputs the gate signals to the gate lines GL. For example, the gate driver 300 may sequentially output the gate signals to the gate lines GL. In an embodiment, the gate driver 300 may be mounted on the peripheral region PA of the display panel 100. In an embodiment, the gate driver 300 may be integrated on the peripheral region PA of the display panel 100.

The gamma reference voltage generator 400 generates a gamma reference voltage VGREF in response to the gamma control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 receives the data control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate the panel power voltage VELVDD and the low panel power voltage VELVSS in response to the power control signal CONT4 received from the driving controller 200.

The gamma voltage control circuit 700 may generate the first reference voltage VAREG and the second reference voltage VAREF in which a change of the panel power voltage VELVDD is reflected. The gamma voltage control circuit 700 may output the first reference voltage VAREG and the second reference voltage VAREF to the gamma reference voltage generator 400.

Figure 2:
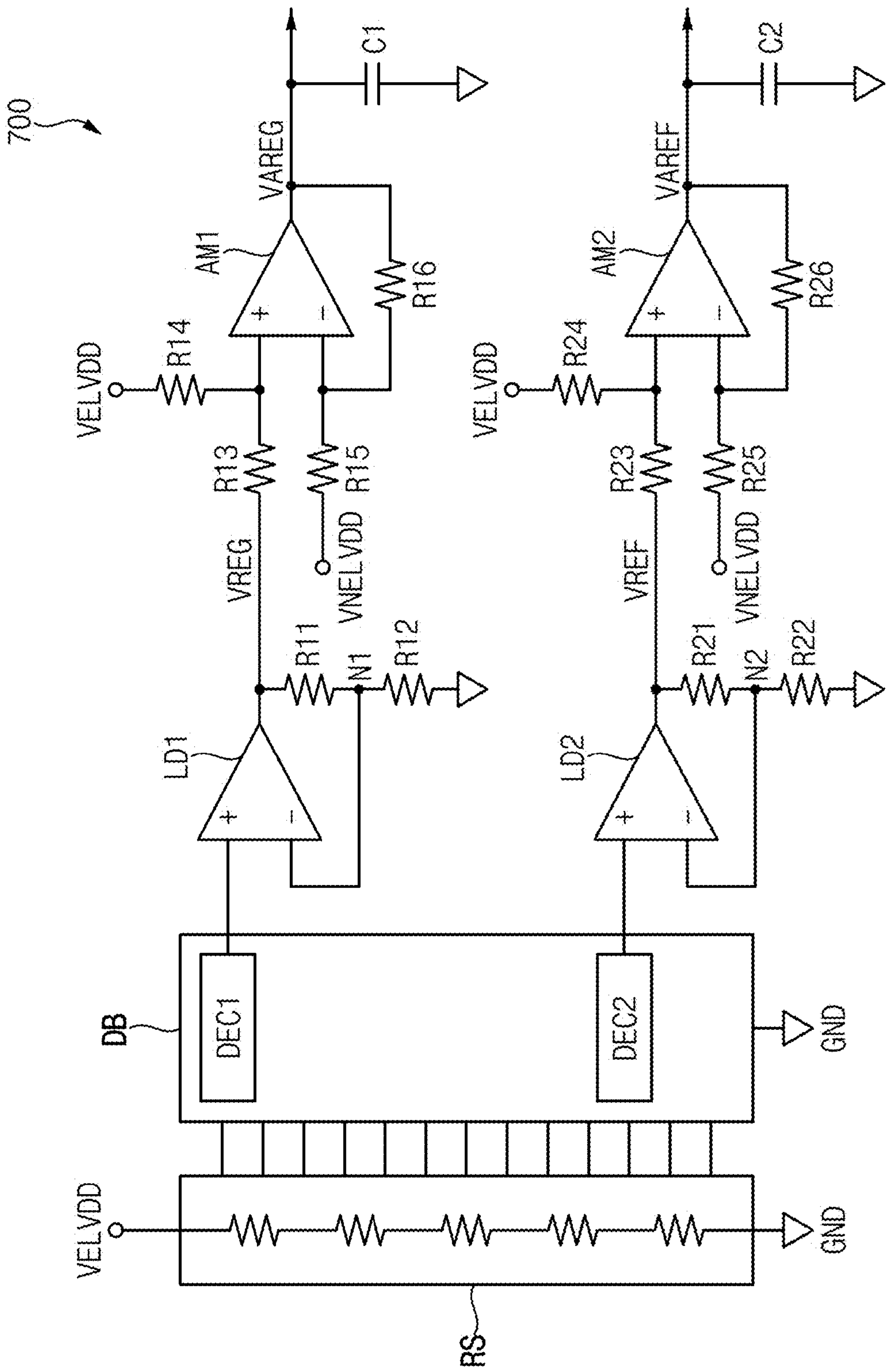
FIG. 2 is a circuit diagram illustrating a gamma voltage control circuit of FIG. 1.
Figure 3:
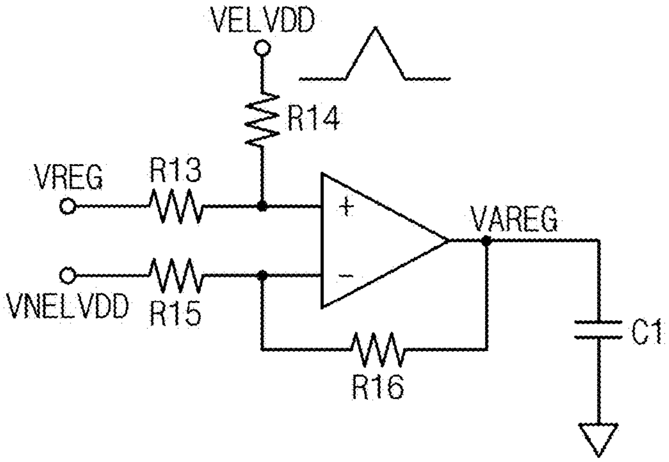
FIGS. 3 and 4 are diagrams illustrating a panel power voltage applied to a display panel and a first reference voltage applied to a gamma reference voltage generator when a noise occurs in the panel power voltage.
Figure 4:
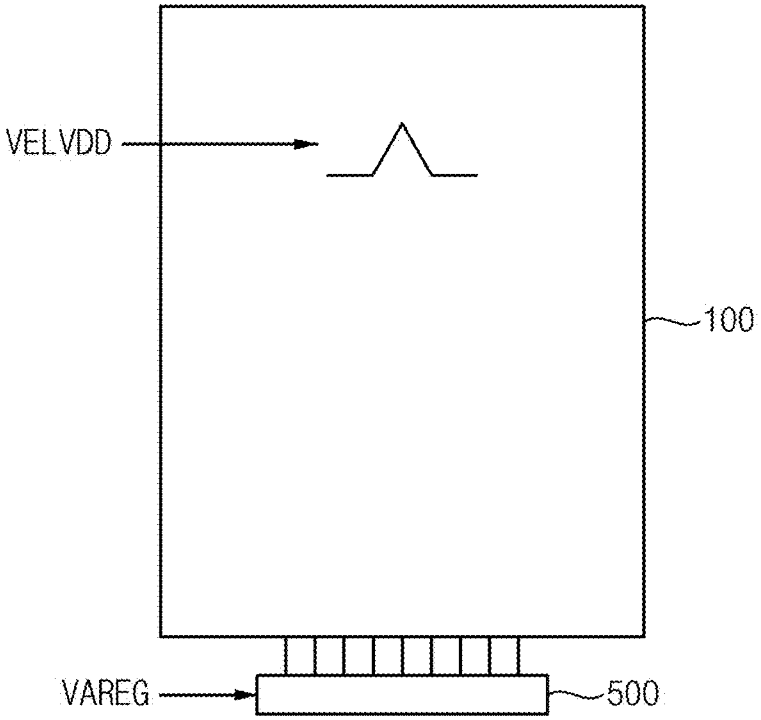
Figure 5A:
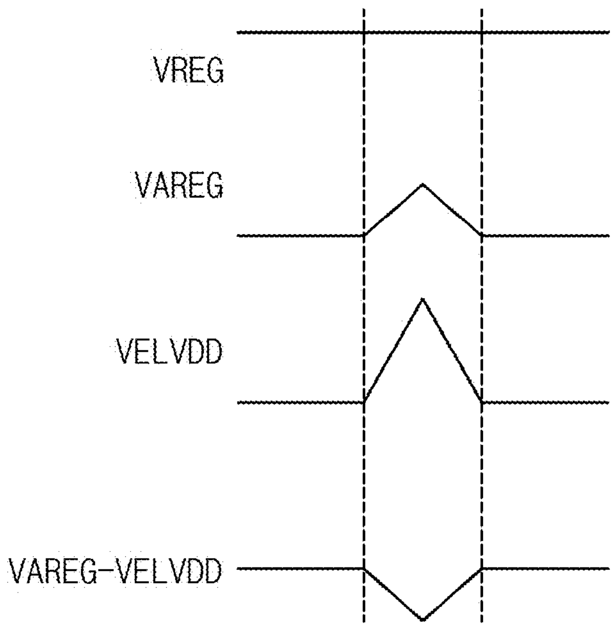
FIG. 5A is a waveform diagram illustrating a first primitive reference voltage, a first reference voltage, a panel power voltage and a difference between the first reference voltage and the panel power voltage in a display apparatus according to a comparative embodiment when the noise occurs in the panel power voltage.
Figure 5B:
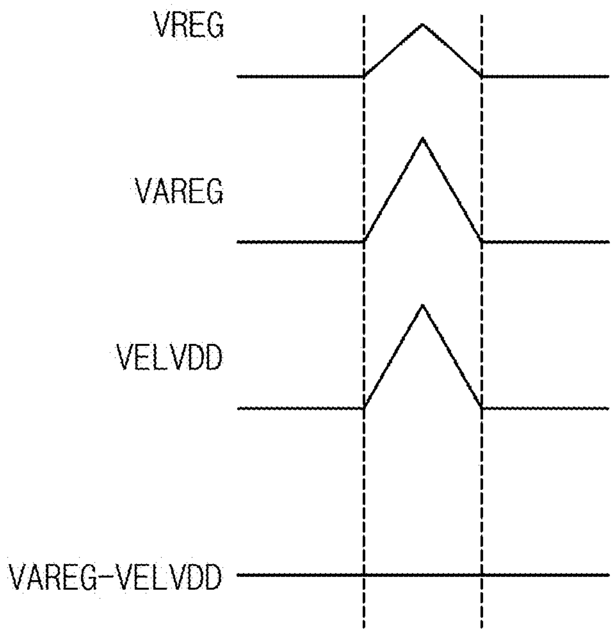
FIG. 5B is a waveform diagram illustrating a first primitive reference voltage, a first reference voltage, a panel power voltage and a difference between the first reference voltage and the panel power voltage in the display apparatus including the gamma voltage control circuit of FIG. 2 when the noise occurs in the panel power voltage.

FIG. 2 is a circuit diagram illustrating the gamma voltage control circuit 700 of FIG. 1. FIGS. 3 and 4 are diagrams illustrating the panel power voltage VELVDD applied to the display panel 100 and the first reference voltage VAREG applied to the gamma reference voltage generator 400 when a noise occurs in the panel power voltage VELVDD. FIG. 5A is a waveform diagram illustrating a first primitive reference voltage VREG, the first reference voltage VAREG, the panel power voltage VELVDD and a difference VAREG−VELVDD between the first reference voltage and the panel power voltage in a display apparatus according to a comparative embodiment when the noise occurs in the panel power voltage. FIG. 5B is a waveform diagram illustrating the first primitive reference voltage VREG, the first reference voltage VAREG, the panel power voltage VELVDD and the difference VAREG−VELVDD between the first reference voltage and the panel power voltage in the display apparatus including the gamma voltage control circuit 700 of FIG. 2 when the noise occurs in the panel power voltage VELVDD.

Referring to FIGS. 1 to 5B, the gamma voltage control circuit 700 includes a first amplifier LD1 and a second amplifier AM1. The first amplifier LD1 generates the first primitive reference voltage VREG based on the panel power voltage VELVDD. The second amplifier AM1 generates the first reference voltage VAREG based on the first primitive reference voltage VREG, the panel power voltage VELVDD and an internal power voltage VNELVDD. Herein, the internal power voltage VNELVDD may be generated inside the gamma voltage control circuit 700. For example, the internal power voltage VNELVDD may be generated inside the gamma voltage control circuit 700 using a VCIR voltage which is an analog reference voltage.

The gamma voltage control circuit 700 may further include a third amplifier LD2 generating the second primitive reference voltage VREF based on the panel power voltage VELVDD and a fourth amplifier AM2 generating the second reference voltage VAREF based on the second primitive reference voltage VREF, the panel power voltage VELVDD and the internal power voltage VNELVDD.

Herein, the first reference voltage VAREG may be a high reference voltage for the gamma reference voltage generator 400 to generate the gamma reference voltage VGREF. The second reference voltage VAREF may be a low reference voltage for the gamma reference voltage generator 400 to generate the gamma reference voltage VGREF. For example, the gamma reference voltage generator 400 may generate the gamma reference voltage VGREF which is between the first reference voltage VAREG and the second reference voltage VAREF. For example, the first reference voltage VAREG may correspond to a black grayscale value. For example, the second reference voltage VAREF may correspond to a white grayscale value. For example, in FIG. 4, the gamma reference voltage generator 400 may be disposed in the data driver 500 so that the first reference voltage VAREG may be applied to the gamma reference voltage generator 400 in the data driver 500.

The gamma voltage control circuit 700 may further include a resistor string RS and a first decoder DEC1. The resistor string RS may include a first end receiving the panel power voltage VELVDD. The first decoder DEC1 may be connected between the resistor string RS and the first amplifier LD1. The gamma voltage control circuit 700 may further include a second decoder DEC2 connected between the resistor string RS and the third amplifier LD2.

The first decoder DEC1 and the second decoder DEC2 may be included in a decoder block DB. A second end of the resistor string RS may be connected to a ground. In addition, an end portion of the decoder block DB may be connected to the ground.

For example, the first amplifier LD1 may be a first low dropout regulator. For example, the third amplifier LD2 may be a second low dropout regulator.

The first amplifier LD1 may include a non-inverting input terminal connected to the first decoder DEC1, an inverting input terminal connected to a first node N1, an output terminal outputting the first primitive reference voltage VREG, a first resistor R11 connected between the output terminal and the first node N1 and a second resistor R12 connected between the first node N1 and the ground.

The first amplifier LD1 may generate the first primitive reference voltage VREG by amplifying a first selected voltage outputted from the first decoder DEC1 in a first gain. In the present embodiment, the first primitive reference voltage VREG may be generated based on the panel power voltage VELVDD so that a noise of the panel power voltage VELVDD may be reflected in the first primitive reference voltage VREG.

For example, the first gain may be determined by the first resistor R11 and the second resistor R12.

The second amplifier AM1 may be a first differential amplifier. The second amplifier AM1 may include a non-inverting input terminal receiving the first primitive reference voltage VREG and the panel power voltage VELVDD, an inverting input terminal receiving the internal power voltage VNELVDD and an output terminal outputting the first reference voltage VAREG.

The gamma voltage control circuit 700 may further include a third resistor R13 including a first end portion connected to the output terminal of the first amplifier LD1 and a second end portion connected to the non-inverting input terminal of the second amplifier AM1, a fourth resistor R14 including a first end portion receiving the panel power voltage VELVDD and a second end portion connected to the non-inverting input terminal of the second amplifier AM1, a fifth resistor R15 including a first end portion receiving the internal power voltage VNELVDD and a second end portion connected to the inverting input terminal of the second amplifier AM1 and a sixth resistor R16 including a first end portion connected to the inverting input terminal of the second amplifier AM1 and a second end portion connected to the output terminal of the second amplifier AM1. In addition, a first capacitor C1 may be connected to the output terminal of the second amplifier AM1.

For example, the third resistor R13 and the fourth resistor R14 may have the same resistance value. In addition, the fifth resistor R15 and the sixth resistor R16 may have the same resistance value.

The third amplifier LD2 may include a non-inverting input terminal connected to the second decoder DEC2, an inverting input terminal connected to a second node N2, an output terminal outputting the second primitive reference voltage VREF, a seventh resistor R21 connected between the output terminal and the second node N2 and an eighth resistor R22 connected between the second node N2 and the ground.

The third amplifier LD2 may generate the second primitive reference voltage VREF by amplifying a second selected voltage outputted from the second decoder DEC2 in a second gain. In the present embodiment, the second primitive reference voltage VREF may be generated based on the panel power voltage VELVDD so that a noise of the panel power voltage VELVDD may be reflected in the second primitive reference voltage VREF.

For example, the second gain may be determined by the seventh resistor R21 and the eighth resistor R22.

The fourth amplifier AM2 may be a second differential amplifier. The fourth amplifier AM2 may include a non-inverting input terminal receiving the second primitive reference voltage VREF and the panel power voltage VELVDD, an inverting input terminal receiving the internal power voltage VNELVDD and an output terminal outputting the second reference voltage VAREF.

The gamma voltage control circuit 700 may further include a ninth resistor R23 including a first end portion connected to the output terminal of the third amplifier LD2 and a second end portion connected to the non-inverting input terminal of the fourth amplifier AM2, a tenth resistor R24 including a first end portion receiving the panel power voltage VELVDD and a second end portion connected to the non-inverting input terminal of the fourth amplifier AM2, an eleventh resistor R25 including a first end portion receiving the internal power voltage VNELVDD and a second end portion connected to the inverting input terminal of the fourth amplifier AM2 and a twelfth resistor R26 including a first end portion connected to the inverting input terminal of the fourth amplifier AM2 and a second end portion connected to the output terminal of the fourth amplifier AM2. In addition, a second capacitor C2 may be connected to the output terminal of the fourth amplifier AM2.

For example, the ninth resistor R23 and the tenth resistor R24 may have the same resistance value. In addition, the eleventh resistor R25 and the twelfth resistor R26 may have the same resistance value.

When the first reference voltage is VAREG, the first primitive reference voltage is VREG, the panel power voltage is VELVDD and the internal power voltage is VNELVDD, an equation, VAREG=VREG+VELVDD−VNELVDD, may be satisfied.

When the second reference voltage is VAREF, the second primitive reference voltage is VREF, the panel power voltage is VELVDD and the internal power voltage is VNELVDD, an equation, VAREF=VREF+VELVDD−VNELVDD, may be satisfied.

FIGS. 3 and 4 illustrate a case in which instantaneous noise occurs in the panel power voltage VELVDD. FIG. 5A illustrates a waveform diagram of a conventional gamma control circuit according to a comparative embodiment. FIG. 5B illustrates a waveform diagram of the gamma control circuit according to a present embodiment.

In FIG. 5A, in the gamma voltage control circuit according to the comparative embodiment, the first primitive reference voltage VREG may be generated based not on the panel power voltage VELVDD but on another power voltage (e.g. the VCIR voltage which is the analog reference voltage). Thus, although the noise occurs in the panel power voltage VELVDD, a level of the first primitive reference voltage VREG does not change.

In the gamma voltage control circuit according to the comparative example, the first reference voltage VAREG may slightly increase according to the noise of the panel power voltage VELVDD according to the operation of the second amplifier AM1. However, the operation of the second amplifier AM1 may not completely follow the rapidly increasing noise peak. Thus, for example, when a magnitude of a peak of the noise of the panel power voltage VELVDD is 0.2V, a peak of the first reference voltage VAREG may follow up by about 0.1V. Accordingly, a difference between the first reference voltage VAREG and the panel power voltage VELVDD may be about −0.1V. Thus, according to the comparative embodiment, when the difference between the first reference voltage VAREG and the panel power voltage VELVDD is generated, the display panel 100 may display an undesired luminance.

In FIG. 5B, in the gamma voltage control circuit 700 according to the present embodiment, the first primitive reference voltage VREG may be generated based on the panel power voltage VELVDD. Thus, the noise of the panel power voltage VELVDD may be reflected in the level of the first primitive reference voltage VREG.

In the gamma voltage control circuit 700 according to the present embodiment, the peak of the first reference voltage VAREG may greatly increase following the noise of the panel power voltage VELVDD according to the increase of the first primitive reference voltage VREG and the operation of the second amplifier AM1 compared to the case of FIG. 5A. Thus, for example, when a magnitude of a peak of the noise of the panel power voltage VELVDD is 0.2V, a peak of the first reference voltage VAREG may follow up by about 0.2V. Accordingly, a difference between the first reference voltage VAREG and the panel power voltage VELVDD may be maintained constant. When the difference between the first reference voltage VAREG and the panel power voltage VELVDD is maintained constant, the display panel 100 may display a desired luminance despite the noise of the panel power voltage VELVDD.

According to the present embodiment, the gamma voltage control circuit 700 may generate the first primitive reference voltage VREG based on the panel power voltage VELVDD applied to the display panel 100 and may generate the first reference voltage VAREG based on the first primitive reference voltage VREG so that the change of the panel power voltage VELVDD may be quickly reflected in the first reference voltage VAREG.

In addition, the gamma voltage control circuit 700 may generate the second primitive reference voltage VREF based on the panel power voltage VELVDD applied to the display panel 100 and may generate the second reference voltage VAREF based on the second primitive reference voltage VREF so that the change of the panel power voltage VELVDD may be quickly reflected in the second reference voltage VAREF.

Thus, when the noise occurs in the panel power voltage VELVDD, the first and second reference voltages VAREG and VAREF may quickly follow the panel power voltage VELVDD so that the undesired luminance may be prevented from being displayed on the display panel 100 due to the difference between the first and second reference voltages VAREG and VAREF and the panel power voltage VELVDD. Thus, the display quality of the display panel 100 may be enhanced.

Figure 6:
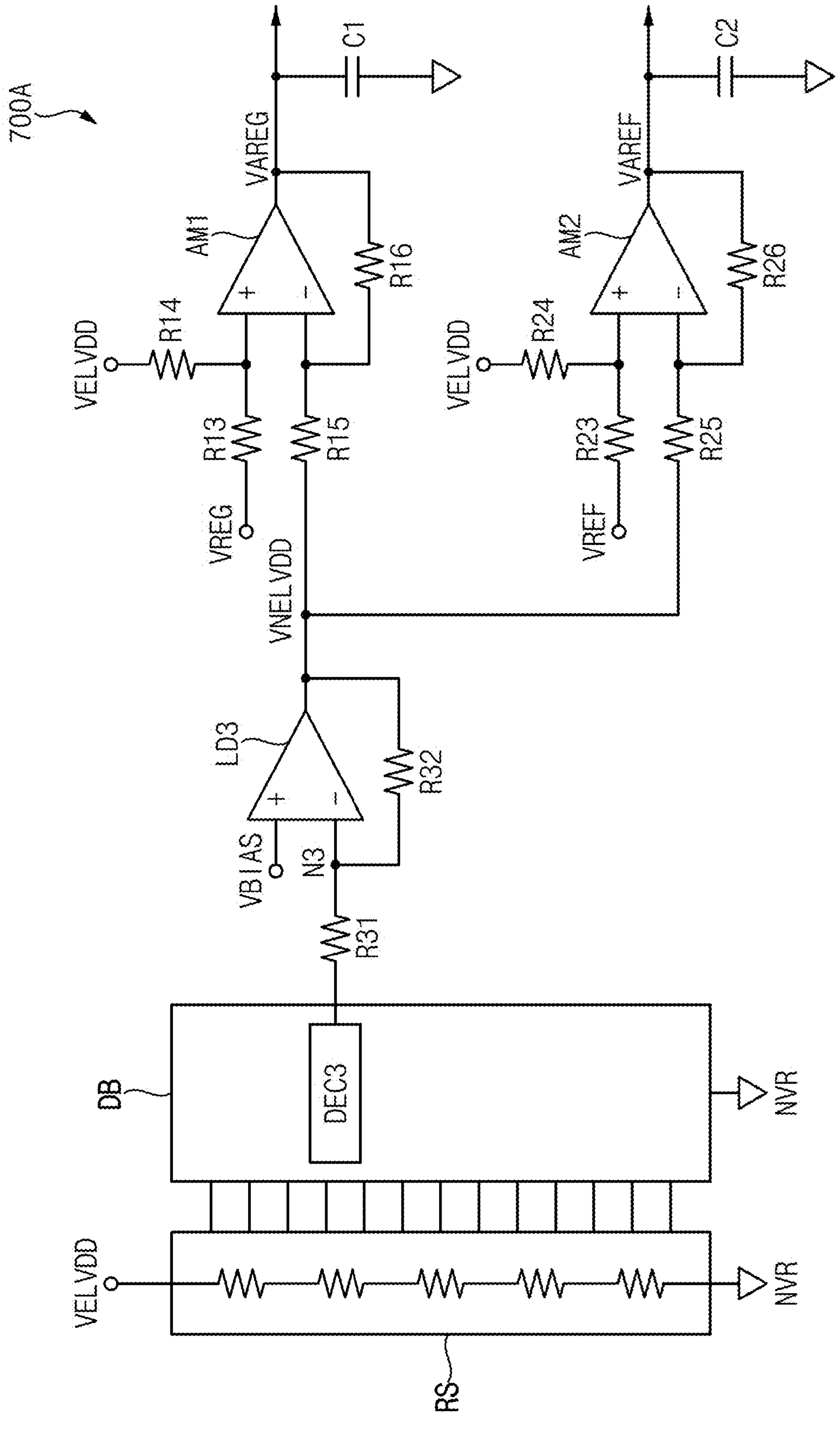
FIG. 6 is a circuit diagram illustrating a gamma voltage control circuit of a display apparatus according to an embodiment of the present inventive concept.
Figure 7A:
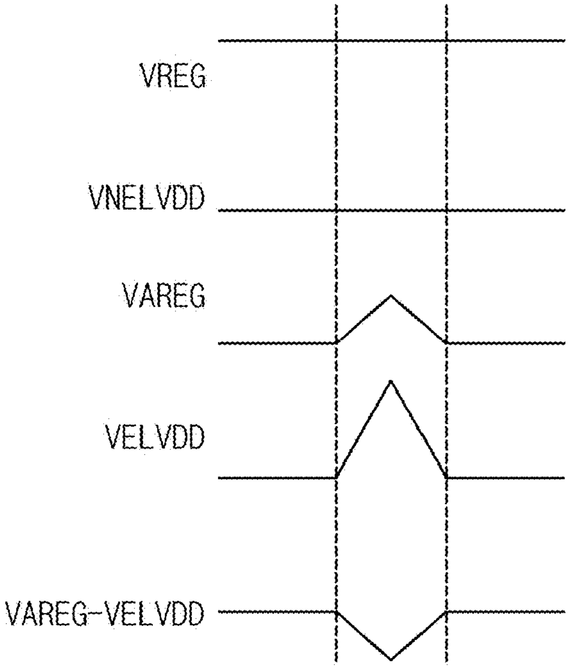
FIG. 7A is a waveform diagram illustrating a first primitive reference voltage, an internal power voltage, a first reference voltage, a panel power voltage and a difference between the first reference voltage and the panel power voltage in a display apparatus according to a comparative embodiment when the noise occurs in the panel power voltage.
Figure 7B:
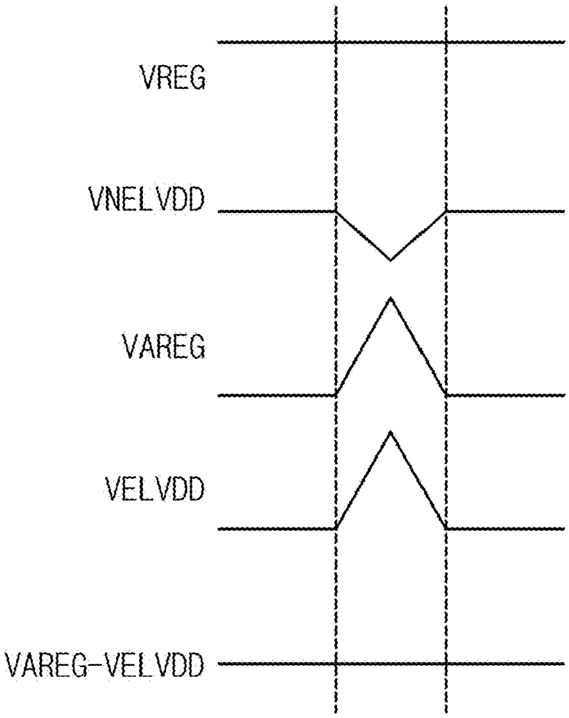
FIG. 7B is a waveform diagram illustrating a first primitive reference voltage, an internal power voltage, a first reference voltage, a panel power voltage and a difference between the first reference voltage and the panel power voltage in the display apparatus including the gamma voltage control circuit of FIG. 6 when the noise occurs in the panel power voltage.

FIG. 6 is a circuit diagram illustrating a gamma voltage control circuit 700A of a display apparatus according to an embodiment of the present inventive concept. FIG. 7A is a waveform diagram illustrating a first primitive reference voltage VREG, an internal power voltage VNELVDD, a first reference voltage VAREG, a panel power voltage VELVDD and a difference VAREG−VELVDD between the first reference voltage and the panel power voltage in a display apparatus according to a comparative embodiment when the noise occurs in the panel power voltage VELVDD. FIG. 7B is a waveform diagram illustrating the first primitive reference voltage VREG, the internal power voltage VNELVDD, the first reference voltage VAREG, the panel power voltage VELVDD and the difference VAREG−VELVDD between the first reference voltage and the panel power voltage in the display apparatus including the gamma voltage control circuit 700A of FIG. 6 when the noise occurs in the panel power voltage VELVDD.

The display apparatus according to the present embodiment is substantially the same as the display apparatus of the previous embodiment explained referring to FIGS. 1 to 5B except for the structure of the gamma voltage control circuit. Thus, the same reference numerals will be used to refer to the same or like parts as those described in the previous embodiment of FIGS. 1 to 5B and any repetitive explanation concerning the above elements will be omitted.

The gamma voltage control circuit 700 of FIG. 2 may generate the first and second reference voltage VAREG and VAREF based on the panel power voltage VELVDD. The gamma voltage control circuit 700A of the present embodiment generates the internal power voltage VNELVDD based on the panel power voltage VELVDD so that the gamma voltage control circuit 700A of the present embodiment may obtain an effect similar to the gamma voltage control circuit 700 of FIG. 2.

Referring to FIGS. 1, 6, 7A and 7B, the display apparatus includes a display panel 100 and a display panel driver. The display panel driver includes a driving controller 200, a gate driver 300, a gamma reference voltage generator 400 and a data driver 500.

The display panel driver may further include a power voltage generator 600. The power voltage generator 600 may generate a panel power voltage VELVDD and a low panel power voltage VELVSS which are applied to the display panel 100. The display panel driver may further include a gamma voltage control circuit 700A. The gamma voltage control circuit 700A may output a first reference voltage VAREG and a second reference voltage VAREF to the gamma reference voltage generator 400.

The power voltage generator 600 may apply the panel power voltage VELVDD and the low panel power voltage VELVSS to the display panel 100. In addition, the power voltage generator 600 may output the panel power voltage VELVDD to the gamma voltage control circuit 700A.

The gamma voltage control circuit 700A may generate the first reference voltage VAREG and the second reference voltage VAREF in which a change of the panel power voltage VELVDD is reflected. The gamma voltage control circuit 700A may output the first reference voltage VAREG and the second reference voltage VAREF to the gamma reference voltage generator 400.

The gamma voltage control circuit 700A includes a first amplifier LD3, a second amplifier AM1 and a third amplifier AM2. The first amplifier LD3 generates the internal power voltage VNELVDD based on the panel power voltage VELVDD applied to the display panel 100. The second amplifier AM1 generates the first reference voltage VAREG based on the first primitive reference voltage VREG, the panel power voltage VELVDD and the internal power voltage VNELVDD. The third amplifier AM2 generates the second reference voltage VAREF based on the second primitive reference voltage VREF, the panel power voltage VELVDD and the internal power voltage VNELVDD.

Herein, the first primitive reference voltage VREG and the second primitive reference voltage VREF may be generated inside the gamma voltage control circuit 700A. For example, the first primitive reference voltage VREG and the second primitive reference voltage VREF may be generated inside the gamma voltage control circuit 700A using the VCIR voltage which is the analog reference voltage.

The gamma voltage control circuit 700A may further include a resistor string RS and a decoder DEC3. The resistor string RS may include a first end receiving the panel power voltage VELVDD and a second end receiving an internal reference voltage NVR. The decoder DEC3 may be connected between the resistor string RS and the first amplifier LD3.

The first amplifier LD3 may include a non-inverting input terminal receiving a bias voltage VBIAS, an inverting input terminal connected to a third node N3, an output terminal outputting the internal power voltage VNELVDD, a first resistor R31 connected between the decoder DEC3 and the third node N3 and a second resistor R32 connected between the inverting input terminal and the output terminal.

The first amplifier LD3 may generate the internal power voltage VNELVDD by amplifying a third selected voltage outputted from the decoder DEC3 in a third gain. In the present embodiment, the internal power voltage VNELVDD may be generated based on the panel power voltage VELVDD so that a noise of the panel power voltage VELVDD may be reflected in the internal power voltage VNELVDD.

For example, the third gain may be determined by the first resistor R31 and the second resistor R32. The first amplifier LD3 is an inverting amplifier so that the third gain may be a negative value. The internal power voltage VNELVDD is a positive value so that the third selected voltage which is an output of the decoder DEC3 may be a negative value. To generate the third selected voltage which is the negative value, the internal reference voltage NVR may be a negative value.

The second amplifier AM1 may include a non-inverting input terminal receiving the first primitive reference voltage VREG and the panel power voltage VELVDD, an inverting input terminal receiving the internal power voltage VNELVDD and an output terminal outputting the first reference voltage VAREG.

The third amplifier AM2 may include a non-inverting input terminal receiving the second primitive reference voltage VREF and the panel power voltage VELVDD, an inverting input terminal receiving the internal power voltage VNELVDD and an output terminal outputting the second reference voltage VAREF.

In FIG. 7A, in the gamma voltage control circuit according to the comparative embodiment, the internal power voltage VNELVDD may be generated based not on the panel power voltage VELVDD but on another power voltage (e.g. the VCIR voltage which is the analog reference voltage). Thus, although the noise occurs in the panel power voltage VELVDD, a level of the internal power voltage VNELVDD does not change.

In the gamma voltage control circuit according to the comparative example, the first reference voltage VAREG may slightly increase according to the noise of the panel power voltage VELVDD according to the operation of the second amplifier AM1. However, the operation of the second amplifier AM1 may not completely follow the rapidly increasing noise peak. Thus, for example, when a magnitude of a peak of the noise of the panel power voltage VELVDD is 0.2V, a peak of the first reference voltage VAREG may follow up by about 0.1V. Accordingly, a difference between the first reference voltage VAREG and the panel power voltage VELVDD may be about −0.1V. When the difference between the first reference voltage VAREG and the panel power voltage VELVDD is generated, the display panel 100 may display an undesired luminance.

In FIG. 7B, in the gamma voltage control circuit 700A according to the present embodiment, the internal power voltage VNELVDD may be generated based on the panel power voltage VELVDD. Thus, the noise of the panel power voltage VELVDD may be reflected in the level of the internal power voltage VNELVDD.

In the gamma voltage control circuit 700A according to the present embodiment, the peak of the first reference voltage VAREG may greatly increase following the noise of the panel power voltage VELVDD according to the decrease of the internal power voltage VNELVDD and the operation of the second amplifier AM1 compared to the case of FIG. 7A. Thus, for example, when a magnitude of a peak of the noise of the panel power voltage VELVDD is 0.2V, a peak of the first reference voltage VAREG may follow up by about 0.2V. Accordingly, a difference between the first reference voltage VAREG and the panel power voltage VELVDD may be maintained constant. When the difference between the first reference voltage VAREG and the panel power voltage VELVDD is maintained constant, the display panel 100 may display a desired luminance despite the noise of the panel power voltage VELVDD.

According to the present embodiment, the gamma voltage control circuit 700A may generate the internal power voltage VNELVDD based on the panel power voltage VELVDD applied to the display panel 100 and may generate the first reference voltage VAREG and the second reference voltage VAREF based on the internal power voltage VNELVDD so that the change of the panel power voltage VELVDD may be quickly reflected in the first reference voltage VAREG and the second reference voltage VAREF.

Thus, when the noise occurs in the panel power voltage VELVDD, the first and second reference voltages VAREG and VAREF may quickly follow the panel power voltage VELVDD so that the undesired luminance may be prevented from being displayed on the display panel 100 due to the difference between the first and second reference voltages VAREG and VAREF and the panel power voltage VELVDD. Thus, the display quality of the display panel 100 may be enhanced.

Figure 8:
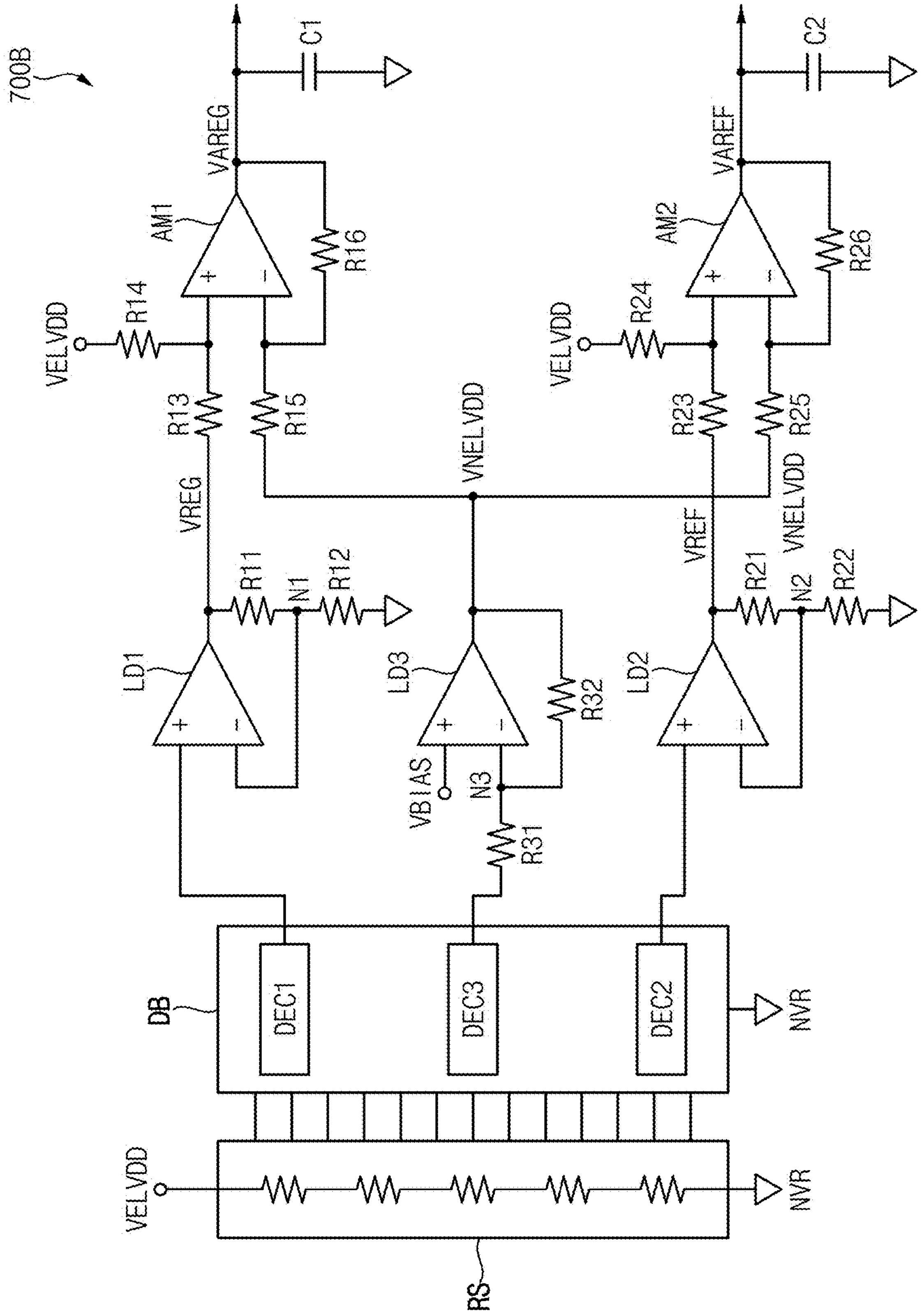
FIG. 8 is a circuit diagram illustrating a gamma voltage control circuit of a display apparatus according to an embodiment of the present inventive concept.
Figure 9A:
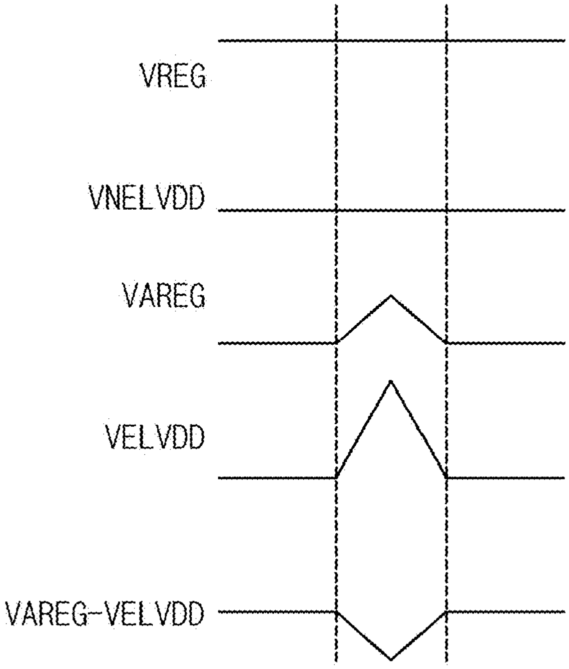
FIG. 9A is a waveform diagram illustrating a first primitive reference voltage, an internal power voltage, a first reference voltage, a panel power voltage and a difference between the first reference voltage and the panel power voltage in a display apparatus according to a comparative embodiment when the noise occurs in the panel power voltage.
Figure 9B:
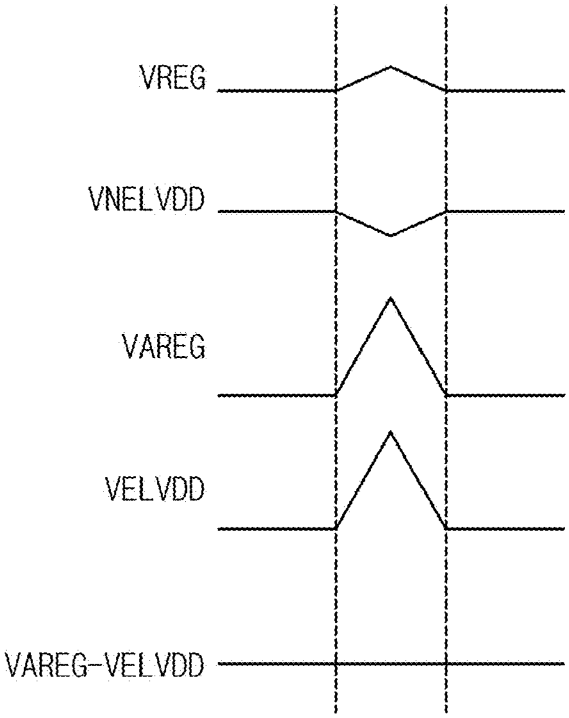
FIG. 9B is a waveform diagram illustrating a first primitive reference voltage, an internal power voltage, a first reference voltage, a panel power voltage and a difference between the first reference voltage and the panel power voltage in the display apparatus including the gamma voltage control circuit of FIG. 8 when the noise occurs in the panel power voltage.

FIG. 8 is a circuit diagram illustrating a gamma voltage control circuit 700B of a display apparatus according to an embodiment of the present inventive concept. FIG. 9A is a waveform diagram illustrating a first primitive reference voltage VREG, an internal power voltage VNELVDD, a first reference voltage VAREG, a panel power voltage VELVDD and a difference VAREG−VELVDD between the first reference voltage and the panel power voltage in a display apparatus according to a comparative embodiment when the noise occurs in the panel power voltage VELVDD. FIG. 9B is a waveform diagram illustrating the first primitive reference voltage VREG, the internal power voltage VNELVDD, the first reference voltage VAREG, the panel power voltage VELVDD and the difference VAREG−VELVDD between the first reference voltage and the panel power voltage in the display apparatus including the gamma voltage control circuit 700B of FIG. 8 when the noise occurs in the panel power voltage VELVDD.

The display apparatus according to the present embodiment is substantially the same as the display apparatus of the previous embodiment explained referring to FIGS. 1 to 5B except for the structure of the gamma voltage control circuit. Thus, the same reference numerals will be used to refer to the same or like parts as those described in the previous embodiment of FIGS. 1 to 5B and any repetitive explanation concerning the above elements will be omitted.

The gamma voltage control circuit 700 of FIG. 2 may generate the first and second reference voltage VAREG and VAREF based on the panel power voltage VELVDD. The gamma voltage control circuit 700A of the FIG. 6 generates the internal power voltage VNELVDD based on the panel power voltage VELVDD. The gamma voltage control circuit 700B of the present embodiment generates the first and second reference voltage VAREG and VAREF and the internal power voltage VNELVDD based on the panel power voltage VELVDD so that the gamma voltage control circuit 700B of the present embodiment may obtain an effect similar to the gamma voltage control circuit 700 of FIG. 2 and the gamma voltage control circuit 700A of FIG. 2.

Referring to FIGS. 1 and 8 to 9B, the display apparatus includes a display panel 100 and a display panel driver. The display panel driver includes a driving controller 200, a gate driver 300, a gamma reference voltage generator 400 and a data driver 500.

The display panel driver may further include a power voltage generator 600. The power voltage generator 600 may generate a panel power voltage VELVDD and a low panel power voltage VELVSS which are applied to the display panel 100. The display panel driver may further include a gamma voltage control circuit 700B. The gamma voltage control circuit 700B may output a first reference voltage VAREG and a second reference voltage VAREF to the gamma reference voltage generator 400.

The power voltage generator 600 may apply the panel power voltage VELVDD and the low panel power voltage VELVSS to the display panel 100. In addition, the power voltage generator 600 may output the panel power voltage VELVDD to the gamma voltage control circuit 700B.

The gamma voltage control circuit 700B may generate the first reference voltage VAREG and the second reference voltage VAREF in which a change of the panel power voltage VELVDD is reflected. The gamma voltage control circuit 700B may output the first reference voltage VAREG and the second reference voltage VAREF to the gamma reference voltage generator 400.

The gamma voltage control circuit 700B includes a first amplifier LD1 and a second amplifier AM1. The first amplifier LD1 generates the first primitive reference voltage VREG based on the panel power voltage VELVDD. The second amplifier AM1 generates the first reference voltage VAREG based on the first primitive reference voltage VREG, the panel power voltage VELVDD and an internal power voltage VNELVDD.

The gamma voltage control circuit 700B may further include a third amplifier LD2 generating the second primitive reference voltage VREF based on the panel power voltage VELVDD and a fourth amplifier AM2 generating the second reference voltage VAREF based on the second primitive reference voltage VREF, the panel power voltage VELVDD and the internal power voltage VNELVDD.

The gamma voltage control circuit 700B may further include a fifth amplifier LD3 generating the internal power voltage VNELVDD based on the panel power voltage VELVDD.

The first amplifier LD1 may include a non-inverting input terminal connected to the first decoder DEC1, an inverting input terminal connected to a first node N1, an output terminal outputting the first primitive reference voltage VREG, a first resistor R11 connected between the output terminal and the first node N1 and a second resistor R12 connected between the first node N1 and the ground.

The third amplifier LD2 may generate the second primitive reference voltage VREF by amplifying a second selected voltage outputted from the second decoder DEC2 in a second gain. In the present embodiment, the second primitive reference voltage VREF may be generated based on the panel power voltage VELVDD so that a noise of the panel power voltage VELVDD may be reflected in the second primitive reference voltage VREF.

The fifth amplifier LD3 may generate the internal power voltage VNELVDD by amplifying a third selected voltage outputted from a third decoder DEC3 in a third gain. In the present embodiment, the internal power voltage VNELVDD may be generated based on the panel power voltage VELVDD so that a noise of the panel power voltage VELVDD may be reflected in the internal power voltage VNELVDD.

The second amplifier AM1 may include a non-inverting input terminal receiving the first primitive reference voltage VREG and the panel power voltage VELVDD, an inverting input terminal receiving the internal power voltage VNELVDD and an output terminal outputting the first reference voltage VAREG.

The fourth amplifier AM2 may include a non-inverting input terminal receiving the second primitive reference voltage VREF and the panel power voltage VELVDD, an inverting input terminal receiving the internal power voltage VNELVDD and an output terminal outputting the second reference voltage VAREF.

In FIG. 9A, in the gamma voltage control circuit according to the comparative embodiment, the first and second primitive reference voltages VREG and VREF and the internal power voltage VNELVDD may be generated based not on the panel power voltage VELVDD but on another power voltage (e.g. the VCIR voltage). Thus, although the noise occurs in the panel power voltage VELVDD, levels of the first and second primitive reference voltages VREG and VREF and the internal power voltage VNELVDD do not change.

In the gamma voltage control circuit according to the comparative example, the first reference voltage VAREG may slightly increase according to the noise of the panel power voltage VELVDD according to the operation of the second amplifier AM1. However, the operation of the second amplifier AM1 may not completely follow the rapidly increasing noise peak. Thus, for example, when a magnitude of a peak of the noise of the panel power voltage VELVDD is 0.2V, a peak of the first reference voltage VAREG may follow up by about 0.1V. Accordingly, a difference between the first reference voltage VAREG and the panel power voltage VELVDD may be about −0.1V. When the difference between the first reference voltage VAREG and the panel power voltage VELVDD is generated, the display panel 100 may display an undesired luminance.

In FIG. 9B, in the gamma voltage control circuit 700B according to the present embodiment, the first and second primitive reference voltages VREG and VREF and the internal power voltage VNELVDD may be generated based on the panel power voltage VELVDD. Thus, the noise of the panel power voltage VELVDD may be reflected in the levels of the first and second primitive reference voltages VREG and VREF and the internal power voltage VNELVDD.

In the gamma voltage control circuit 700B according to the present embodiment, the peak of the first reference voltage VAREG may greatly increase following the noise of the panel power voltage VELVDD according to the increase of the first and second primitive reference voltages VREG and VREF, the decrease of the internal power voltage VNELVDD and the operation of the second amplifier AM1 compared to the case of FIG. 9A. Thus, for example, when a magnitude of a peak of the noise of the panel power voltage VELVDD is 0.2V, a peak of the first reference voltage VAREG may follow up by about 0.2V. Accordingly, a difference between the first reference voltage VAREG and the panel power voltage VELVDD may be maintained constant. When the difference between the first reference voltage VAREG and the panel power voltage VELVDD is maintained constant, the display panel 100 may display a desired luminance despite the noise of the panel power voltage VELVDD.

According to the present embodiment, the gamma voltage control circuit 700B may generate the first primitive reference voltage VREG based on the panel power voltage VELVDD applied to the display panel 100 and may generate the first reference voltage VAREG based on the first primitive reference voltage VREG so that the change of the panel power voltage VELVDD may be quickly reflected in the first reference voltage VAREG.

In addition, the gamma voltage control circuit 700B may generate the second primitive reference voltage VREF based on the panel power voltage VELVDD applied to the display panel 100 and may generate the second reference voltage VAREF based on the second primitive reference voltage VREF so that the change of the panel power voltage VELVDD may be quickly reflected in the second reference voltage VAREF.

In addition, the gamma voltage control circuit 700B may generate the internal power voltage VNELVDD based on the panel power voltage VELVDD applied to the display panel 100 and may generate the first reference voltage VAREG and the second reference voltage VAREF based on the internal power voltage VNELVDD so that the change of the panel power voltage VELVDD may be quickly reflected in the first reference voltage VAREG and the second reference voltage VAREF.

Thus, when the noise occurs in the panel power voltage VELVDD, the first and second reference voltages VAREG and VAREF may quickly follow the panel power voltage VELVDD so that the undesired luminance may be prevented from being displayed on the display panel 100 due to the difference between the first and second reference voltages VAREG and VAREF and the panel power voltage VELVDD. Thus, the display quality of the display panel 100 may be enhanced.

Figure 10:
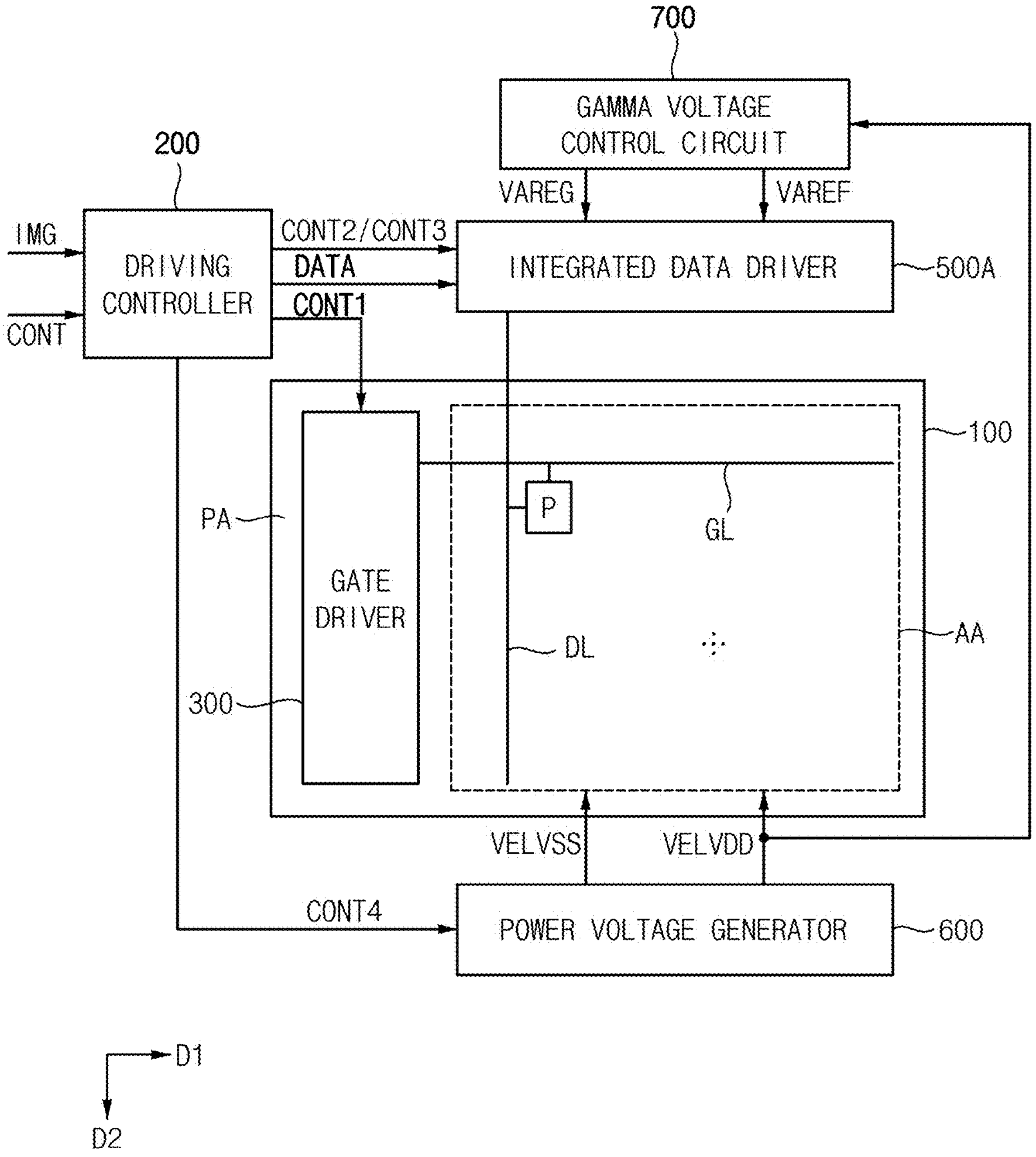
FIG. 10 is a block diagram illustrating a display apparatus according to an embodiment of the present inventive concept.

FIG. 10 is a block diagram illustrating a display apparatus according to an embodiment of the present inventive concept.

The display apparatus according to the present embodiment is substantially the same as the display apparatus of the previous embodiment explained referring to FIGS. 1 to 5B except that the gamma reference voltage generator and the data driver are integrally formed. Thus, the same reference numerals will be used to refer to the same or like parts as those described in the previous embodiment of FIGS. 1 to 5B and any repetitive explanation concerning the above elements will be omitted.

The gamma voltage control circuit 700 of FIG. 2, the gamma voltage control circuit 700A of FIG. 6 and the gamma voltage control circuit 700B of FIG. 7 may be applied to the display apparatus of the present embodiment.

Referring to FIGS. 2 to 10, the display apparatus includes a display panel 100 and a display panel driver. The display panel driver includes a driving controller 200, a gate driver 300 and an integrated data driver 500A.

The display panel driver may further include a power voltage generator 600. The power voltage generator 600 may generate a panel power voltage VELVDD and a low panel power voltage VELVSS which are applied to the display panel 100. The display panel driver may further include a gamma voltage control circuit 700. The gamma voltage control circuit 700 may output a first reference voltage VAREG and a second reference voltage VAREF to the integrated data driver 500A.

The power voltage generator 600 may apply the panel power voltage VELVDD and the low panel power voltage VELVSS to the display panel 100. In addition, the power voltage generator 600 may output the panel power voltage VELVDD to the gamma voltage control circuit 700.

The gamma voltage control circuit 700 may generate the first reference voltage VAREG and the second reference voltage VAREF in which a change of the panel power voltage VELVDD is reflected. The gamma voltage control circuit 700 may output the first reference voltage VAREG and the second reference voltage VAREF to the integrated data driver 500A.

The gamma voltage control circuit 700 includes a first amplifier LD1 and a second amplifier AM1. The first amplifier LD1 generates the first primitive reference voltage VREG based on the panel power voltage VELVDD. The second amplifier AM1 generates the first reference voltage VAREG based on the first primitive reference voltage VREG, the panel power voltage VELVDD and an internal power voltage VNELVDD.

The gamma voltage control circuit 700 may further include a third amplifier LD2 generating the second primitive reference voltage VREF based on the panel power voltage VELVDD and a fourth amplifier AM2 generating the second reference voltage VAREF based on the second primitive reference voltage VREF, the panel power voltage VELVDD and the internal power voltage VNELVDD.

According to the present embodiment, the gamma voltage control circuit 700 may generate the first primitive reference voltage VREG based on the panel power voltage VELVDD applied to the display panel 100 and may generate the first reference voltage VAREG based on the first primitive reference voltage VREG so that the change of the panel power voltage VELVDD may be quickly reflected in the first reference voltage VAREG.

In addition, the gamma voltage control circuit 700 may generate the second primitive reference voltage VREF based on the panel power voltage VELVDD applied to the display panel 100 and may generate the second reference voltage VAREF based on the second primitive reference voltage VREF so that the change of the panel power voltage VELVDD may be quickly reflected in the second reference voltage VAREF.

Alternatively, as shown in FIGS. 6 and 8, the gamma voltage control circuit 700A and 700B may generate the internal power voltage VNELVDD based on the panel power voltage VELVDD applied to the display panel 100 and may generate the first reference voltage VAREG and the second reference voltage VAREF based on the internal power voltage VNELVDD so that the change of the panel power voltage VELVDD may be quickly reflected in the first reference voltage VAREG and the second reference voltage VAREF.

Thus, when the noise occurs in the panel power voltage VELVDD, the first and second reference voltages VAREG and VAREF may quickly follow the panel power voltage VELVDD so that the undesired luminance may be prevented from being displayed on the display panel 100 due to the difference between the first and second reference voltages VAREG and VAREF and the panel power voltage VELVDD. Thus, the display quality of the display panel 100 may be enhanced.

Figure 11:
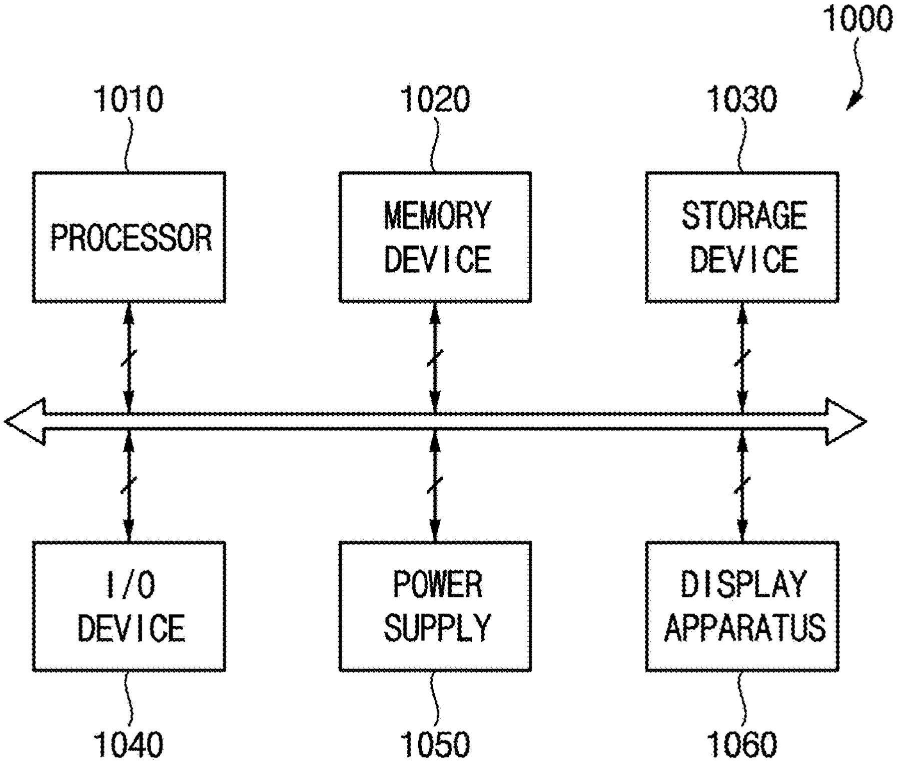
FIG. 11 is a block diagram illustrating an electronic apparatus according to an embodiment of the present inventive concept.
Figure 12:
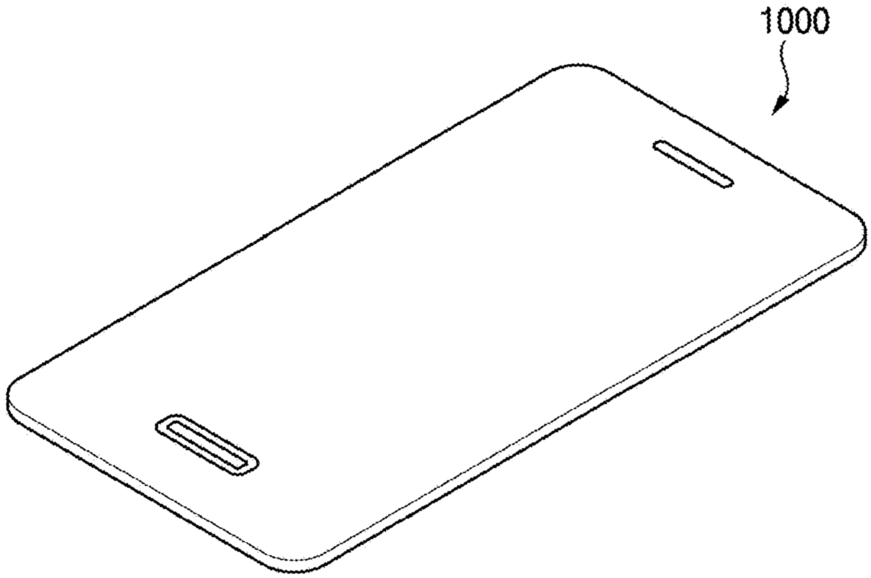
FIG. 12 is a diagram illustrating an example in which the electronic apparatus of FIG. 11 is implemented as a smart phone.

FIG. 11 is a block diagram illustrating an electronic apparatus according to an embodiment of the present inventive concept. FIG. 12 is a diagram illustrating an example in which the electronic apparatus of FIG. 11 is implemented as a smart phone.

Referring to FIGS. 11 and 12, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1 or the display apparatus of FIG. 10. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 12, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1 or the driving controller 200 of FIG. 10.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 13:
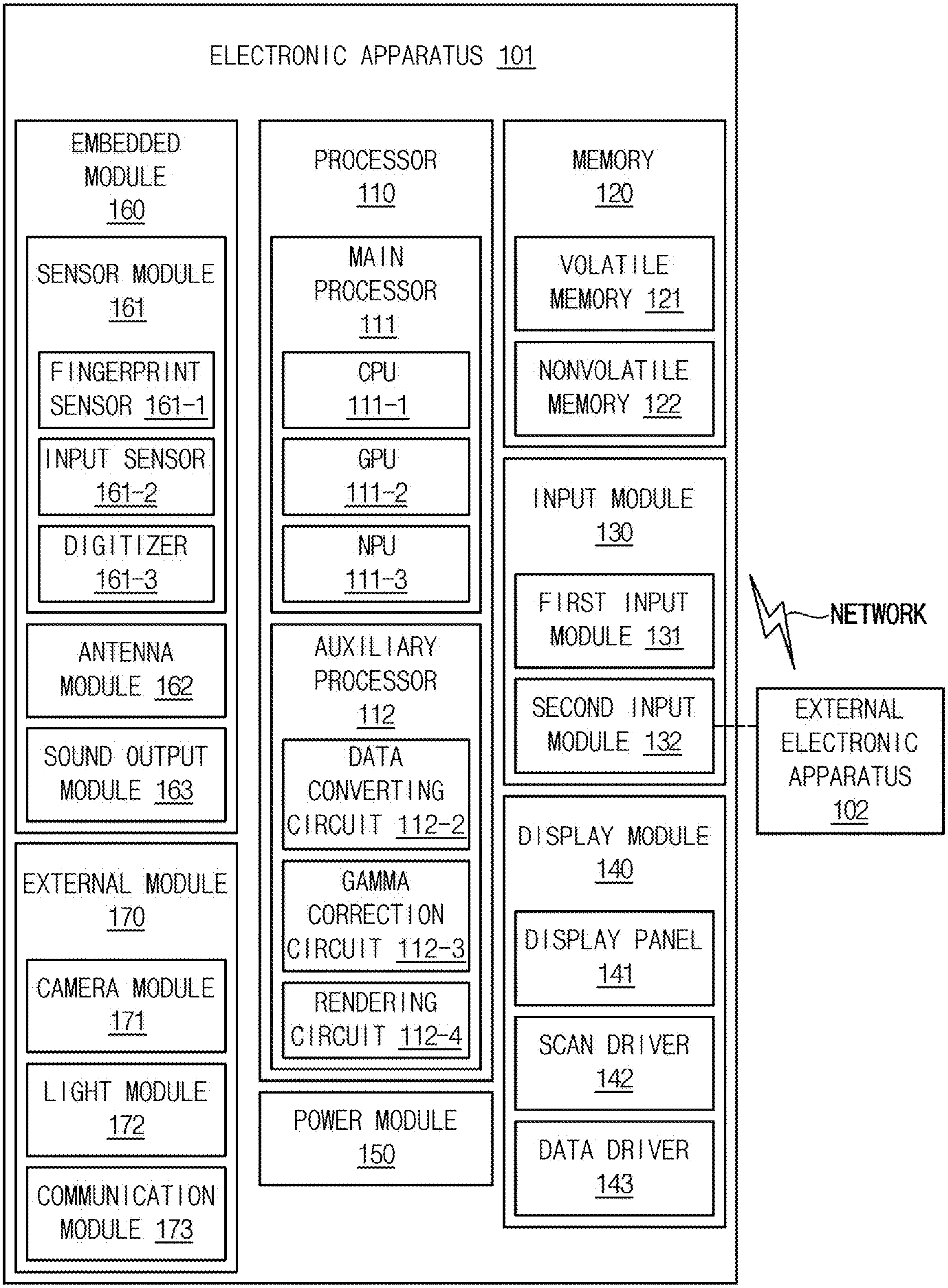
FIG. 13 is a block diagram illustrating an electronic apparatus according to an embodiment of the present inventive concept.

FIG. 13 is a block diagram illustrating an electronic apparatus 101 according to an embodiment of the present inventive concept.

Referring to FIGS. 1 to 13, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g. a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic apparatus 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g. the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g. the processor 110 or the sensor module 161) of the electronic apparatus 101 and input data or output data for commands related thereto. The memory 120 may include at least one of the volatile memory 121 and the nonvolatile memory 122.

The input module 130 may receive commands or data used to the elements (e.g. the processor 110, the sensor module 161 or the sound output module 163) of the electronic apparatus 101 from the outside of the electronic apparatus 101 (e.g. the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g. a button) or a pen (e.g. a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g. a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. For example, the scan driver 142 may include an amorphous silicon TFT gate driver circuit (ASG) integrated on the display panel 141, a low temperature polycrystaline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g. the data voltage) and output the data voltages to the display panel 141 in response to the control signal.

The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as a blood pressure, a moisture, or a body fat. For example, when a user touches a part of his body to a sensor layer or a sensing panel and does not move for a certain period of time, the input sensor 161-2 may detect the biosignal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g. light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g. the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or a ultra path interconnect (UPI) link to exchange signals (e.g. commands or data) with each other. The processor 110 may communicate with the display module 140 through an agreed interface. For example, the processor 110 may communicate with the display module 140 through any one of the above communication methods. The present invention may not be limited to the above communication methods.

The electronic apparatus 101 according to various embodiments disclosed in the disclosure may be various types of apparatuses. For example, the electronic apparatus 101 may include at least one of a portable communication apparatus (e.g. a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

For example, the display panel 100 of FIG. 1 may correspond to the display panel 141 of FIG. 13. For example, the driving controller 200 of FIG. 1 may correspond to the controller of the auxiliary processor 112 of FIG. 13. For example, the gate driver 300 of FIG. 1 may correspond to the scan driver 142 of FIG. 13. For example, the data driver 500 of FIG. 1 may correspond to the data driver 143 of FIG. 13. For example, the power voltage generator 600 of FIG. 1 may correspond to the power module 150 of FIG. 13.

According to the embodiments of the gamma voltage control circuit, the display apparatus and the electronic apparatus, the display quality of the display panel may be enhanced.

The foregoing is illustrative of the present inventive concept and is not to be construed as limiting thereof. Although embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A gamma voltage control circuit comprising:

a first amplifier configured to generate a first primitive reference voltage based on a panel power voltage applied to a display panel;

a second amplifier configured to generate a first reference voltage based on the first primitive reference voltage, the panel power voltage and an internal power voltage;

a resistor string including a first end configured to receive the panel power voltage; and a first decoder connected to the resistor string and the first amplifier, wherein the first amplifier is a first low dropout regulator.

2. The gamma voltage control circuit of claim 1, further comprising:

a third amplifier configured to generate a second primitive reference voltage based on the panel power voltage; and a fourth amplifier configured to generate a second reference voltage based on the second primitive reference voltage, the panel power voltage and the internal power voltage.

3. The gamma voltage control circuit of claim 2, further comprising a second decoder connected between the resistor string and the third amplifier.

4. The gamma voltage control circuit of claim 3, wherein the third amplifier is a second low dropout regulator.

5. The gamma voltage control circuit of claim 3, wherein the third amplifier comprises:

a non-inverting input terminal connected to the second decoder;

an inverting input terminal connected to a second node;

an output terminal configured to output the second primitive reference voltage;

a seventh resistor connected between the output terminal and the second node; and an eighth resistor connected between the second node and a ground.

6. The gamma voltage control circuit of claim 2, wherein the fourth amplifier is a second differential amplifier.

7. The gamma voltage control circuit of claim 2, wherein the fourth amplifier comprises:

a non-inverting input terminal configured to receive the second primitive reference voltage and the panel power voltage;

an inverting input terminal configured to receive the internal power voltage; and an output terminal configured to output the second reference voltage.

8. The gamma voltage control circuit of claim 1, wherein the second amplifier comprises:

a non-inverting input terminal configured to receive the first primitive reference voltage and the panel power voltage;

an inverting input terminal configured to receive the internal power voltage; and an output terminal configured to output the first reference voltage.

9. The gamma voltage control circuit of claim 8, further comprising:

a third resistor including a first end portion connected to an output terminal of the first amplifier and a second end portion connected to the non-inverting input terminal of the second amplifier, a fourth resistor including a first end portion configured to receive the panel power voltage and a second end portion connected to the non-inverting input terminal of the second amplifier;

a fifth resistor including a first end portion configured to receive the internal power voltage and a second end portion connected to the inverting input terminal of the second amplifier; and a sixth resistor including a first end portion connected to the inverting input terminal of the second amplifier and a second end portion connected to the output terminal of the second amplifier.

10. The gamma voltage control circuit of claim 8, wherein when the first reference voltage is VAREG, the first primitive reference voltage is VREG, the panel power voltage is VELVDD and the internal power voltage is VNELVDD, VAREG=VREG+VELVDD−VNELVDD is satisfied.

11. The gamma voltage control circuit of claim 1, further comprising a fifth amplifier configured to generate the internal power voltage based on the panel power voltage.

12. The gamma voltage control circuit of claim 11, further comprising a third decoder connected between the resistor string and the fifth amplifier.

13. The gamma voltage control circuit of claim 1, wherein the first amplifier comprises:

a non-inverting input terminal connected to the first decoder;

an inverting input terminal connected to a first node;

an output terminal configured to output the first primitive reference voltage;

a first resistor connected between the output terminal and the first node; and a second resistor connected between the first node and a ground.

14. The gamma voltage control circuit of claim 1, wherein the second amplifier is a first differential amplifier.

15. A gamma voltage control circuit comprising:

a first amplifier configured to generate an internal power voltage based on a panel power voltage applied to a display panel;

a second amplifier configured to generate a first reference voltage based on a first primitive reference voltage, the panel power voltage and the internal power voltage;

a third amplifier configured to generate a second reference voltage based on a second primitive reference voltage, the panel power voltage and the internal power voltage;

a resistor string including a first end configured to receive the panel power voltage and a second end configured to receive an internal reference voltage; and a decoder connected between the resistor string and the first amplifier, wherein the first amplifier comprises:

a non-inverting input terminal configured to receive a bias voltage;

an inverting input terminal connected to a third node;

an output terminal configured to output the internal power voltage;

a first resistor connected between the decoder and the third node; and a second resistor connected between the inverting input terminal and the output terminal.

16. The gamma voltage control circuit of claim 15, wherein the second amplifier comprises:

a non-inverting input terminal configured to receive the first primitive reference voltage and the panel power voltage;

an inverting input terminal configured to receive the internal power voltage; and an output terminal configured to output the first reference voltage.

17. The gamma voltage control circuit of claim 16, wherein the third amplifier comprises:

a non-inverting input terminal configured to receive the second primitive reference voltage and the panel power voltage;

an inverting input terminal configured to receive the internal power voltage; and an output terminal configured to output the second reference voltage.

18. An electronic apparatus comprising:

a display panel;

a power voltage generator configured to output a panel power voltage to the display panel;

a gate driver configured to output a gate signal to the display panel;

a data driver configured to output a data voltage to the display panel;

a gamma reference voltage generator configured to output a gamma reference voltage to the data driver;

a gamma voltage control circuit configured to output a first reference voltage and a second reference voltage to the gamma reference voltage generator;

a driving controller configured to control the gate driver and the data driver; and a processor configured to output input image data and an input control signal to the driving controller, wherein the gamma voltage control circuit comprises:

a first amplifier configured to generate a first primitive reference voltage based on a panel power voltage;

a second amplifier configured to generate the first reference voltage based on the first primitive reference voltage, the panel power voltage and an internal power voltage;

a resistor string including a first end configured to receive the panel power voltage; and a first decoder connected to the resistor string and the first amplifier, wherein the first amplifier is a first low dropout regulator.

19. The electronic apparatus of claim 18, wherein the data driver and the gamma reference voltage generator are integrally formed.

* * * * *